United States Patent [19]

Aoki et al.

[11] Patent Number: 5,276,122

[45] Date of Patent: Jan. 4, 1994

[54] METHOD OF MANUFACTURING AMINOGROUP-CONTAINING POLYSILOXANES OF UNIFORM QUALITY

[75] Inventors: Hisashi Aoki; Shoji Ichinohe; Kazuaki Sutoh, all of Annaka, Japan

[73] Assignee: Shin-Etsu Chemical Co., Ltd., Tokyo, Japan

[21] Appl. No.: 929,548

[22] Filed: Aug. 14, 1992

[30] Foreign Application Priority Data

Aug. 15, 1991 [JP] Japan ................... 3-229502

[51] Int. Cl.$^5$ ............................................. C08G 77/06
[52] U.S. Cl. ......................................... 528/14; 528/18; 528/21; 528/23; 528/37; 528/38
[58] Field of Search .................. 528/37, 38, 14, 18, 528/21, 23

[56] References Cited

U.S. PATENT DOCUMENTS 4,661,577  4/1987  Lane et al. ........................ 528/37
4,888,405  12/1989  Gamon et al. ..................... 528/37

*Primary Examiner*—Melvyn I. Marquis
*Attorney, Agent, or Firm*—Millen, White, Zelano & Branigan

[57] ABSTRACT

A method of manufacturing aminogroup-containing polysiloxanes of uniform quality characterized in that a cyclic organopolysiloxane represented by the following general formula:

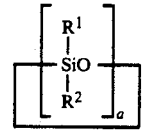

and an aminoalkylpolysiloxane represented by the following general formula:

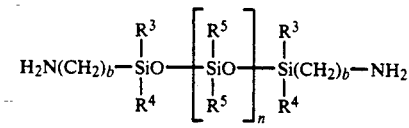

are heated together in the presence of a basic catalyst.

11 Claims, No Drawings

METHOD OF MANUFACTURING AMINOGROUP-CONTAINING POLYSILOXANES OF UNIFORM QUALITY

FIELD OF INVENTION

This invention concerns a method of manufacturing aminogroup-containing polysiloxanes, and in particular a method of manufacturing aminogroup-containing polysiloxanes of uniform quality.

BACKGROUND OF INVENTION

Aminogroup-containing polysiloxanes have excellent thermal stability together with water repelling, antifoaming and interface properties such as surface lubrication, and they are therefore used in a wide variety of different fields. Conventionally, these compounds were manufactured by heating one or more cyclic organopolysiloxanes with aminopropyldisiloxane in a ring cleaving reaction in the presence of a compound containing an alkali metal such as an alkali metal oxide, alkali metal hydroxide, alkali metal alkoxide, alkali metal aryloxide or alkali metal silanolate, a quaternary ammonium compound, or a quaternary phosphonium compound.

In the aforesaid manufacturing method, however, the viscosity of the reaction solution increased sharply during the reaction. This rendered the reaction system non-uniform so that a reaction product of uniform viscosity could not be obtained, and a gel-like substance was also partly formed. It was therefore difficult to manufacture an aminogroup-containing polysiloxane of uniform quality.

To overcome this disadvantage, a method has been proposed wherein a cyclic polyether is added in the aforesaid manufacturing process (Japanese Tokkai Hei 3-95227:Published unexamined application).

However, this cyclic polyether (of the crown polyether type) is costly, and the cost of manufacturing the aminogroup-containing polysiloxanes therefore increased.

After carrying out exhaustive studies, the inventors discovered that aminogroup-containing polysiloxanes could be easily manufactured by heating and reacting a specific cyclic organopolysiloxane with a specific aminoalkylpolysiloxane in the presence of a basic catalyst.

SUMMARY OF THE INVENTION

An object of the present invention is to provide an economical method of manufacturing good quality aminogroup-containing polysiloxanes.

The above object of the invention is attained by a method of manufacturing aminogroup-containing polysiloxanes characterized in that a cyclic organopolysiloxane represented by the following general formula (1):

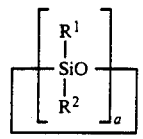

and an aminoalkylpolysiloxane represented by the following general formula (2):

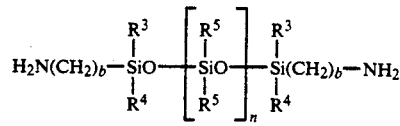

are heated together in the presence of a basic catalyst.

DETAILED DESCRIPTION OF THE INVENTION

In the cyclic organopolysiloxane represented by the above general formula (1) used in the present invention, $R^1$ and $R^2$ are identical or different, unsubstituted or substituted monofunctional hydrocarbon groups, and a is an integer no less than 3.

The aforesaid monofunctional hydrocarbon group may for example be an alkyl group such as methyl, ethyl, propyl or octyl, a cycloalkyl group such as cyclohexyl or cycloheptyl, an alkenyl group such as vinyl, allyl or cyclohexenyl, an aryl group such as phenyl or diphenyl, an aralkyl group such as benzyl or phenylethyl, a halogenoalkyl group such as 3,3,3-trifluoropropyl or chloromethyl, a halogenoaryl group such as chlorophenyl or dibromophenyl, or a cyanoalkyl group such as cyanomethyl, 2-cyanoethyl or 3-cyanopropyl.

In this invention, the aforesaid cyclic organopolysiloxane used as starting material may typically be hexamethylcyclotrisiloxane, octamethylcyclotetrasiloxane, octaphenylcyclotetrasiloxane or 1,3,5,7-tetravinyl-1,3,5,7-tetramethylcyclotetrasiloxane, or a mixture of two or more of these cyclic organopolysiloxanes.

A low molecular weight linear diorganopolysiloxane or silane compound may also be mixed with this cyclic organopolysiloxane or mixture of cyclic organopolysiloxanes.

$R^3$, $R^4$ and $R^5$ in the formula for the aminoalkylpolysiloxane represented by the aforesaid general formula (2) used in the invention are identical or different, unsubstituted or substituted monofunctional hydrocarbon groups; b is an integer from 1 to 6; and n is an integer from 1 to 10.

The aforesaid monofunctional hydrocarbon group may for example be an alkyl group such as methyl, ethyl, propyl or octyl, a cycloalkyl group such as cyclohexyl or cycloheptyl, an alkenyl group such as vinyl, allyl or cyclohexenyl, an aryl group such as phenyl or diphenyl, an aralkyl group such as benzyl or phenylethyl, a halogenoalkyl group such as 3,3,3-trifluoropropyl or chloromethyl, a halogenoaryl group such as chlorophenyl or dibromophenyl, or a cyanoalkyl group such as cyanomethyl, 2-cyanoethyl or 3-cyanopropyl.

If n is an integer greater than 10, the amount of aminoalkylpolysiloxane that must be added increases. This increases the cost of manufacturing the aminogroup-containing polysiloxane so that it is no longer a profitable industrial process. It is particularly to be preferred that n is an integer from 4 to 8.

The basic catalyst used in this invention may typically be an alkali metal oxide such as sodium oxide, potassium oxide or lithium oxide; an alkali metal hydroxide such as sodium hydroxide, potassium hydroxide or lithium hydroxide; an alkali metal alkoxide such as sodium methoxide, sodium ethoxide or potassium ethoxide; an alkali metal silanolate such as the potassium salt of methylsilanetriol or the potassium salt of phenylsilanetriol; tetramethylammonium hydroxide or tetrabutylphosphonium hydroxide; or a mixture of two or more of these compounds. The amount of basic catalyst used in this invention is preferably 0.001-0.1 weight %, but from the viewpoint of obtaining a constant polymerization speed more preferably 0.005-0.05 weight %, with respect to the amount of cyclic organopolysiloxane used.

In this invention, the aforesaid reactants can be heated so as to promote the reaction by shifting the equilibrium point between the cyclic organopolysiloxane and aminoalkylpolysiloxane. In this case, there is no specific limitation on the heating temperature, but it is preferably 80°-180° C. and more preferably 120°-150° C.

In this invention, the aforesaid reaction can also be performed in an organic solvent, suitable solvents being for example toluene and xylene.

According to the manufacturing method of this invention, there is no rapid increase in the viscosity of the reaction solution, no partial formation of a gel-like substance and in addition, costly crown ethers are not used. The method therefore permits economical manufacture of good quality aminogroup-containing polysiloxanes. Especially, the present invention is quite suitable for a production of aminogroup-containing polysiloxanes which have a high amine equivalent such as 500-50,000 g/mole.

EXAMPLES

The invention will now be described in more detail by means of the following examples, but it is not to be construed as being limited by them in any way.

EXAMPLE 1

10.9 g of an aminopropylpolysiloxane represented by the following average structural formula(3):

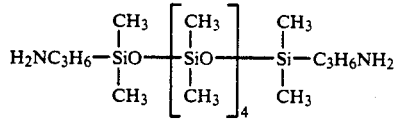

(amine equivalent 272 g/mole) and 0.02 g of potassium hydroxide were added to and blended with 290 g of octamethylcyclotetrasiloxane in an 1 l flask fitted with a reflux condenser. The resulting mixture was heated and stirred at 140°-160° C. for 5 hours so as to obtain a solution containing an aminopropylsiloxane having a viscosity at 25° C. of 530 cS after the reaction was complete.

The solution was neutralized, stripped to remove low molecular weight cyclic organopolysiloxanes, and filtered to give a colorless, transparent aminopropylpolysiloxane.

This filtration was easily carried out without any clogging of the filter paper.

The amine equivalent of the aminopropylpolysiloxane obtained was 7,150 g/mole, the calculated amine equivalent for aminopropylpolysiloxane being 7,524 g/mole.

EXAMPLE 2

5.4 g of an aminopropylpolysiloxane represented by the average structural formula (3) in Example 1, and 0.025 g of potassium hydroxide, were added to and blended with 367 g of octamethylcyclotetrasiloxane. The resulting mixture was heated and stirred at 140°-160° C. for 6 hours so as to obtain a solution containing an aminopropylpolysiloxane having a viscosity at 25° C. of 5,100 cS after the reaction was complete. A determination of volatiles at 150° C., for 3 hours gave a result of 8.2 weight %.

The aforesaid aminopropylpolysiloxane was neutralized, stripped to remove low molecular weight cyclic organopolysiloxanes, and filtered to give a colorless, transparent aminopropylpolysiloxane having an amine equivalent of 18,200 g/mole (a high polymer type silicone oil having a polymerization degree of 500 assuming both ends of the molecule are aminogroup-modified).

COMPARATIVE EXAMPLE 1

An aminopropylpolysiloxane was prepared exactly as in Example 1 excepting that 1,3-bis(3-aminopropyl)tetramethyldisiloxane was used instead of the aminopropylpolysiloxane represented by the average structural formula (3).

The filtration properties of the solution after reaction were poor, and the amine equivalent of the aminopropylpolysiloxane obtained was only 4,250 g/mole.

COMPARATIVE EXAMPLE 2

An aminopropylpolysiloxane was prepared exactly as in Example 2 excepting that 1,3-bis(3-aminopropyl)tetramethyldisiloxane was used instead of the aminopropylpolysiloxane presented by the average structural formula (3).

Immediately after the polymerization reaction, the viscosity of the reaction solution increased sharply, the viscosity of the reaction solution at 25° C. after the reaction was completed was only 3,830 cS, and part of the reaction solution changed to a gel-like substance. This shows that the aminopropylpolysiloxane obtained contained a gel-like substance, and that polymerization was incomplete.

What is claimed is:

1. A method of manufacturing aminogroup-containing polysiloxanes of uniform viscosity which comprises reacting a cyclic organopolysiloxane represented by the formula below:

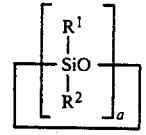

wherein $R^1$ and $R^2$ are identical or different, unsubstituted or substituted monofunctional hydrocarbon groups, and "a" is an integer no less than 3, and an aminoalkylpolysiloxane represented by the formula below:

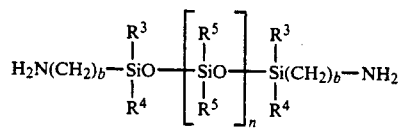

wherein $R^3$, $R^4$ and $R^5$ are identical or different, unsubstituted or substituted, monofunctional hydrocarbon groups, "b" is an integer from 1-6, and "n" is an integer from 1 to 10, in the presence of a basic catalyst selected from the group consisting of an alkali metal oxide, an alkali metal hydroxide, an alkali metal aryloxide, an alkali metal silanolate, tetramethylammonium hydroxide and tetrabutylphosphonium hydroxide at a temperature of from 80° to 180°, to obtain aminogroup-containing polysiloxanes of uniform viscosity.

2. The method of manufacturing aminogroup-containing polysiloxanes of uniform viscosity as defined in claim 1, wherein $R^1$ and $R^2$ is an alkyl, cycloalkyl, alkenyl, aryl, aralkyl, halogenoalkyl, halogenoaryl or cyanoalkyl group.

3. The method of manufacturing aminogroup-containing polysiloxanes of uniform viscosity as defined in claim 1, wherein said cyclic organopolysiloxane is at least one compound chosen from the group hexamethylcyclotrisiloxane, octamethyl-cyclotetrasiloxane, octaphenylcyclotetrasiloxane and 1,3,5,7-tetravinyl-1,3,5,7-tetramethyl-cyclotetrasiloxane, or a mixture of two or more of these cyclic organopolysiloxanes.

4. The method of manufacturing aminogroup-containing polysiloxanes of uniform viscosity as defined in claim 1, wherein "n" is 4 to 8.

5. The method of manufacturing aminogroup-containing polysiloxanes of uniform defined in claim 2, wherein "n" is 4 to 8.

6. The method of manufacturing aminogroup-containing polysiloxanes of uniform viscosity as defined in claim 1, wherein the amount of basic catalyst used with respect to the amount of cyclic organopolysiloxane is 0.001–0.1 weight %.

7. The method of manufacturing aminogroup-containing polysiloxanes of uniform viscosity as defined in claim 6, wherein the amount of basic catalyst used with respect to the amount of cyclic organopolysiloxane is 0.005–0.05 weight %.

8. The method of manufacturing aminogroup-containing polysiloxanes of uniform viscosity as defined in claim 1, wherein the reaction is conducted at a temperature of from 120°–150° C.

9. The method of manufacturing aminogroup-containing polysiloxanes of uniform viscosity as defined in claim 1, wherein the reaction is performed without the use of a solvent.

10. The method of manufacturing aminogroup-containing polysiloxanes of uniform viscosity as defined in claim 1, wherein the reaction is performed in an organic solvent.

11. The method of manufacturing aminogroup-containing polysiloxanes of uniform viscosity as defined in claim 10, wherein the organic solvent is toluene and/or xylene.

* * * * *